US007415699B2

(12) United States Patent
Gouriou et al.

(10) Patent No.: US 7,415,699 B2
(45) Date of Patent: Aug. 19, 2008

(54) METHOD AND APPARATUS FOR CONTROLLING EXECUTION OF A CHILD PROCESS GENERATED BY A MODIFIED PARENT PROCESS

(75) Inventors: Eric Gouriou, Sunnyvale, CA (US);
Robert Hundt, Santa Clara, CA (US);
Sujoy Saraswati, Karnataka (IN);
Sushanth Rai, Sunnyvale, CA (US);
Edward Sharpe, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 692 days.

(21) Appl. No.: 10/608,330

(22) Filed: Jun. 27, 2003

(65) Prior Publication Data
US 2004/0268317 A1  Dec. 30, 2004

(51) Int. Cl.
*G06F 9/44* (2006.01)
(52) U.S. Cl. .................. 717/127; 717/124; 717/125; 717/128; 717/130; 717/131; 718/100
(58) Field of Classification Search ......... 717/130–131, 717/164–179, 124–125, 127–128; 718/100–104; 711/147; 709/102; 714/38
See application file for complete search history.

(56) References Cited

U.S. PATENT DOCUMENTS

| 4,812,981 | A | | 3/1989 | Chan et al. |
|---|---|---|---|---|
| 5,297,274 | A | | 3/1994 | Jackson |
| 5,319,645 | A | | 6/1994 | Bassi et al. |
| 5,835,765 | A | | 11/1998 | Matsumoto |
| 6,049,853 | A | * | 4/2000 | Kingsbury et al. .......... 711/147 |
| 6,185,702 | B1 | | 2/2001 | Shirakihara et al. |
| 6,247,041 | B1 | * | 6/2001 | Krueger et al. .............. 718/104 |
| 6,249,882 | B1 | | 6/2001 | Testardi |
| 6,269,442 | B1 | | 7/2001 | Oberhauser et al. |
| 6,314,567 | B1 | | 11/2001 | Oberhauser et al. |
| 6,618,743 | B1 | * | 9/2003 | Bennett ...................... 718/104 |
| 6,944,860 | B2 | * | 9/2005 | Schmidt ..................... 718/100 |
| 7,114,104 | B1 | * | 9/2006 | Bennett ....................... 714/38 |
| 2002/0133529 | A1 | * | 9/2002 | Schmidt .................... 709/102 |

OTHER PUBLICATIONS

Dynamic Binary Instrumentation on 1A-64, by Ramasamy et al., dated Dec. 1-5, 2001, EPICI Workshop, Micro34, pp. 1-13.
HP Caliper—An Architecture for Performance Analysis Tools, by Robert Hundt, Hewlett-Packard Company, Undated, pp. 1-8. Oct. 2000.

* cited by examiner

*Primary Examiner*—Lewis A. Bullock, Jr.
*Assistant Examiner*—Mark P. Francis

(57) ABSTRACT

A monitoring interface, includes logic responsive to a pre-fork event, the pre-fork event responsive to a vfork system call. The pre-fork event includes indicia that identifies a child process to be created in accordance with the vfork system call. A method for controlling the execution of a child process created from a parent process, where the parent process is monitored by a software tool includes, receiving indicia that a vfork system call will be executed by the parent process, suspending execution of the parent process, extracting a process identifier from the indicia of the vfork system call, the process identifier corresponding to a child process to be generated by the parent process when the parent process executes the vfork system call, setting a process monitor thread to observe the child process, and resuming execution of the parent process to enable the parent process to execute past the vfork system call.

10 Claims, 8 Drawing Sheets

METHOD AND APPARATUS FOR CONTROLLING EXECUTION OF A CHILD PROCESS GENERATED BY A MODIFIED PARENT PROCESS

BACKGROUND

The computing community has developed tools and methods to analyze the run-time behavior of a computer program. Many of the tools and methods use statistical sampling and binary instrumentation techniques. Statistical sampling is performed by recording periodic snapshots of the program's state, e.g., the program's instruction pointer. Sampling imposes a low overhead on a program's run time performance, is relatively non-intrusive, and imprecise. For example, it may be difficult to associate a sampled instruction pointer with the particular instruction that caused the latest sampling event.

While binary instrumentation leads to more precise results, the accuracy comes at some cost to the run-time performance of the instrumented program. Traditional binary instrumentation is static. It involves rewriting the whole program before any run to insert data-gathering code. Because the binary code of a program is modified, all interactions with the processor and the operating system can change significantly. Consequently, binary instrumentation is considered intrusive.

Dynamic binary instrumentation allows program instructions to be changed on-the-fly and leads to a whole class of more precise run-time monitoring results. Unlike static binary instrumentation techniques that are applied over an entire program prior to execution of the program, dynamic binary instrumentation is performed at run-time of a program and only instruments those portions of an executable that are executed. Consequently, dynamic binary instrumentation techniques can significantly reduce the overhead imposed by the instrumentation process.

Software development tools can combine statistical sampling and dynamic binary instrumentation methods into a framework that enables performance analysis, profiling, coverage analysis, correctness checking, and testing of a program.

A basic reason for the difficulty in testing the correctness and performance of a program is that program behavior largely depends on the data on which the program operates and, in the case of interactive programs, on the information (data and commands) received from a user. Therefore, even if exhaustive testing is impossible, as is often the case, program testing and performance analysis is preferably conducted by causing the program to operate with some data. The act of executing a program entails the creation of one or multiple "processes."

A "process" is commonly defined as an address space, one or multiple control threads operating within the address space, and the set of system resources needed for operating with the threads. Therefore, a "process" is a logic entity consisting of the program itself, the data on which it must operate, the memory resources, and input/output resources. Executing a given program may lead to multiple processes being created. Program verification and performance testing encompasses execution of the program to test if the process or processes develop in the correct way or if undesired or unexpected events occur.

Generally, software development tools use two basic techniques to monitor the execution of a given process, in-process monitoring and out-of-process monitoring. In-process monitoring involves modifying a program to be tested so that select program instructions are preceded and followed by overhead instructions that extract variable information, control execution of the instruction, and monitor program execution. With out-of-process monitoring, a monitoring program executes in a different process and interacts with the monitored processes.

Symbolic debuggers constitute an example of out-of-process monitoring. Symbolic debuggers are interactive programs which allow a software engineer to monitor the execution of a compiled program. The user can follow the execution of a compiled program in a familiar high-level programming language while the program to be tested executes. Symbolic debuggers modify an executable copy of the source by selectively inserting conditional branches to other routines, instruction sequences, and break points. The compiled and instrumented program can then be run under the control of a managing program or a software engineer via a human-machine interface.

Symbolic debuggers also enable the insertion of instruction sequences for recording variables used in execution of the instruction and, on user request, can add and remove break points, modify variables, and permit modification of the hardware environment. These techniques are particularly effective in that they permit step-by-step control of the execution of a program, that is, they allow the evolution of the related process to be controlled by halting and restarting the process at will and by changing parameters during the course of execution of the process. The tools also can display the execution status of the process to the software engineer in detail by means of display windows or other output devices that enable the user to continuously monitor the program. Some tools automate the process of setting break points in the executable version of the source code.

Symbolic debuggers have several limitations. First, they operate on only a single process at a time. Second, the process to be tested must be activated by the parent process (the symbolic analysis process) and cannot be activated earlier. Consequently, the debugging of programs, which are activated at system start up, such as monitors, daemons, etc., is problematic.

Furthermore, because the process to be tested is generated as a child of the symbolic analysis parent, and in a certain sense is the result of a combination of the symbolic analysis function/program with the program to be tested, the two processes must share or utilize the same resources. As a consequence, interactive programs that use masks and windows on a display device cannot be tested because they compete or interfere with the symbolic debugger in requiring access to the display device.

Moreover, software development tools that use symbolic debuggers can encounter deadlock conditions that result from the standard execution of operating system level instructions.

One operating system that has gained widespread acceptance is the UNIX® operating system. UNIX® is a trademark of the American Telephone and Telegraph Company of New York, N.Y., U.S.A. The UNIX® operating system is a multi-user, time-sharing operating system with a tree-structured file system. Other noteworthy functional features are its logical I/O capabilities, pipes, and forks. The logical I/O capabilities allow a user to specify the input and output files of a program at runtime rather than at compile time, thus providing greater flexibility. Piping is a feature that enables buffering of input and output data to and from other processes. Forking is a feature that enables the creation of a new process.

By themselves, these features offer no inherent benefits. However, the UNIX® operating system command environment (called the SHELL) provides easy access to these operating system capabilities and also allows them to be used in different combinations. With the proper selection and ordering of system commands, logical I/O, pipes, and forks, a user at the command level can accomplish tasks that on other operating systems would require writing and generating an entirely new program. This ability to easily create application program equivalents from command level is one of the unique and primary benefits of the UNIX® operating system.

The popularity of the UNIX® operating system has led to the creation of numerous open source and proprietary variations such as LINUX®, HP-UX®, etc. LINUX® is a trademark of William R. Della-Croce, Jr. (individual) of Boston, Mass., U.S.A. HP-UX®, is a trademark of the Hewlett-Packard Company, of Palo Alto, Calif., U.S.A. Variants of the UNIX® operating system inherently use the UNIX® operating system's logical I/O capabilities, pipes, and forks.

Software development tools can encounter a deadlock condition when a process under test includes a "vfork" system call. The operation of a "vfork" system call in the UNIX® operating system involves spawning a new process and copying the process image of the parent (the process making the vfork call) to the child process (the newly spawned process).

Monitoring facilities enable a process or thread to control the execution of threads running in another process. Generally, monitoring facilities control other threads by reading and modifying the state of the process. "Thread trace," also known as "ttrace" is a tracing facility for single and multithreaded processes. Ttrace is an evolution of "process trace," also known as "ptrace." A monitoring facility typically allows the monitoring program to declare an interest in the occurrence of particular events associated with any thread or for a specific subset of threads. For example, the monitoring process may want to be informed when a thread receives a signal, invokes a system call, or executes a breakpoint. While under the control of a monitoring facility, the monitored code behaves normally until one of those events occur. At this point, the thread or process enters a stopped or suspended state and the tracing process is notified of the event. In the ttrace facility, the monitoring process receives such notifications by invoking the system call ttrace_wait.

Ttrace_wait can be called in blocking or non-blocking modes. When called in blocking mode, the system call will not return until an event is available. In non-blocking mode the system call will return promptly but may indicate that no event notification is available. When event notification is available, ttrace_wait will provide an indication of the event type encountered.

At a given point in time, a monitoring program may monitor multiple processes, each process including one or multiple threads. Monitoring facilities such as ttrace typically provide a way to separate event notifications from the various processes, or even from the various threads in a given process. In the case of ttrace_wait, the monitoring process will either return events from any process monitored, from any thread in a specified process, or from a specified thread in a specified process. Using the mode where a single ttrace_wait call will provide information about any process monitored can introduce a bottleneck or make run-time analysis too complex.

A vfork system call differs from a fork system call in that the child process created via the vfork system call shares the same address space as the parent until exec or _exit is called, while a child process created via the fork system call gets a copy of the parent address space. In some operating systems, the vfork system call is implemented by having the parent process blocked until the child process calls exec or _exit. This allows for a simple implementation of vfork, as the child process can be created cheaply as it directly uses most of the structures associated with the parent process.

As mentioned above, such an implementation of the vfork system call can present a deadlock condition for debuggers that use known tracing facilities. If the monitoring process is using monitoring facilities that in turn are using per-process notifications, the monitoring process will not be aware of the newly created child process, until the monitoring process is notified that the child process exists. In some existing designs, however, notification is not delivered until the parent process is unblocked. That is, when the child process calls exec or _exit. Furthermore, the child process itself can be blocked as it generates monitoring events. This results in a deadlock, as both the traced parent and child process are blocked while the tracing process waits for an indication of an event that cannot be delivered until the child process is unblocked.

FIG. 1 illustrates the deadlock condition. The process descriptions or blocks in the flow chart presented in FIG. 1 should be understood to represent a somewhat inaccurate overview of an instrumentation process. Those reasonably skilled in the art will understand that an accurate depiction of instrumenting a parent process that executes a vfork to spawn a child process would require a detailed unified modeling language (UML) sequence diagram to reflect the actual interactions in the process.

Deadlock condition 10 occurs between development tool 20, parent process 30, and child process 40 as described below. Development tool 20 identifies a process (e.g., parent process 30) that the development tool 20 would like to monitor as indicated in block 22. Next, development tool 20 spawns parent process 30 under trace control as shown in block 24. A process identifier (PID) is assigned to the parent process 30 by the operating system when the parent process is created.

Thereafter, in block 26, development tool 20 monitors execution of the parent process by monitoring trace events from parent process 30. Under the UNIX® operating system and its open source and proprietary variants, development tool 20 waits for trace events that include the PID of the parent process. Development tool 20 cannot monitor child process 40, since child process 40 has not been created.

Once parent process 30 is created and started, parent process 30 is instrumented and runs nominally in accordance with its instructions as shown in block 32. The parent process 30 runs until it encounters a vfork system call as shown in block 34. Next, parent process 30 spawns child "A" under trace control as shown in block 36. In accordance with the vfork system call, the operating system copies the current state of the parent process 30 to spawn child process 40 and generates a trace event which is received by development tool 20. Thereafter, as shown in block 38, parent process 30 is essentially suspended waiting for an indication that child process 40 has completed (e.g., indicia of an exec or exit).

Once child process 40 is created by the vfork system call in parent process 30, and started, child process 40 is instrumented and runs nominally in accordance with its instructions as shown in block 42. The child process 40 runs nominally in accordance with its instructions until it encounters the vfork system call shown in block 44. Thereafter, as shown in block 46, child process 40 spawns a child "B" process. At this time, the operating system assigns a PID, different from the parent PID and child "A" PID, to identify the subsequent child process. In accordance with the vfork system call, child process 40 copies itself in its instrumented state to spawn the subsequent child process (not shown) and generates a trace event which is ignored by development tool 20 because development tool 20 is only looking for trace events from parent process 30.

Once the vfork system call is encountered and processed in child process 40, the deadlock condition has occurred. Parent process 30 is suspended waiting for an indication that child process 40 has completed. Child process 40, which inherited trace control from parent process 30, waits for a process to handle the trace event generated at the time it executed the vfork system call. Concurrently, development tool 20 waits for a trace event from parent process 30.

Consequently, it is desirable to have an improved apparatus, program, and method to avoid deadlock induced by a vfork system call when monitoring application programming interfaces (APIs) to track the execution of computer programs.

SUMMARY

An embodiment of a monitoring interface, includes a pre-fork event responsive to a vfork system call wherein the pre-fork event includes indicia that identifies a child process to be created in accordance with the vfork system call.

An embodiment of a method for controlling the execution of a child process created from a parent process, where the parent process is monitored by a software tool includes, receiving indicia that a vfork system call will be executed by the parent process, suspending execution of the parent process, extracting a process identifier from the indicia of the vfork system call, the process identifier corresponding to a child process to be generated by the parent process when the parent process executes the vfork system call, setting a monitoring thread to observe the child process, and resuming execution of the parent process to enable the parent process to execute past the vfork system call.

BRIEF DESCRIPTION OF THE DRAWINGS

Systems and methods for controlling execution of a child process generated by a monitored parent process are illustrated by way of example and not limited by the implementations in the following drawings. The components in the drawings are not necessarily to scale, emphasis instead is placed upon clearly illustrating the principles used in controlling the execution of such a child process. Moreover, in the drawings, like reference numerals designate corresponding parts throughout the several views.

DETAILED DESCRIPTION

The improved interface provides system calls to monitor or otherwise control the execution of threads in monitored processes. A thread is that part of a program that can execute independently of other parts of the program. Operating systems such as UNIX® that support multithreading, enable programmers to design programs whose threaded parts can execute concurrently.

The improved monitoring interface includes a pre-fork event and associated processing that can be adapted to multiple tracing facilities such as ttrace and/or ptrace. The improved interface and the associated methods described below enable a software tool to control the execution of a child process initiated by an instrumented parent process, where the parent process includes one or more calls to vfork. While the example embodiments described below are directed to examples where a parent process is instrumented, the present apparatus and methods are applicable to any modified parent process that includes a vfork system call.

Figure 1:
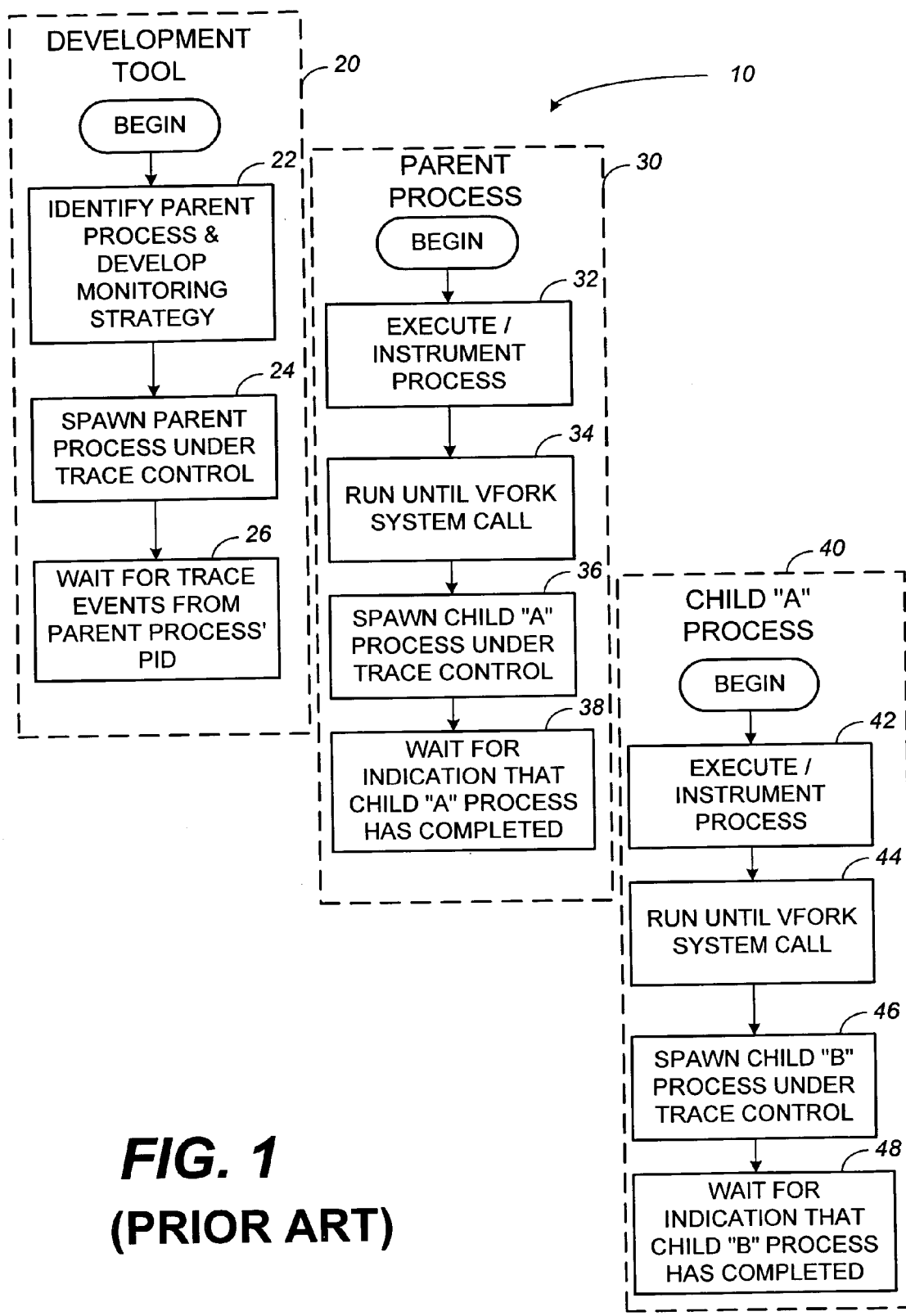
FIG. 1 is a composite flowchart illustrating a prior art deadlock condition.
Figure 2:
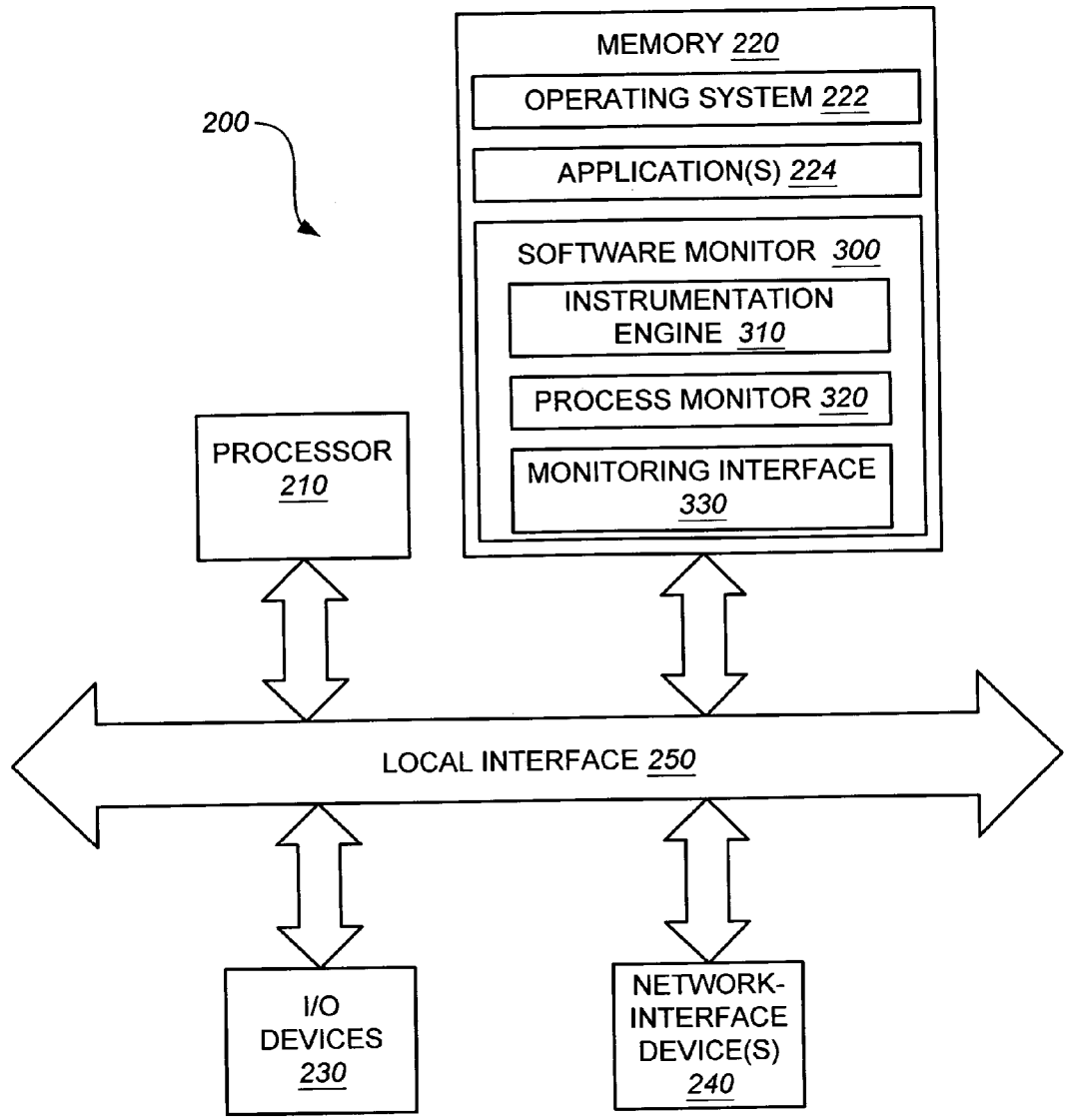
FIG. 2 is a functional block diagram of an embodiment of a computing device.

Turning now to the drawings, wherein like-reference numerals designate corresponding parts throughout the drawings; reference is made to FIG. 2, which illustrates a functional block diagram of a computing device. Generally, in terms of hardware architecture, as shown in FIG. 2, computing device 200 may include a processor 210, memory 220, input/output device interface(s) 230, and LAN/WAN interface(s) 240 that are communicatively coupled via local interface 250. The local interface 250 can be, for example but not limited to, one or more-buses or other wired or wireless connections, as known in the art or that may be later developed. Local interface 250 may have additional elements, which are omitted for simplicity, such as controllers, buffers (caches), drivers, repeaters, and receivers, to enable communications. Further, local interface 250 may include address, control, and/or data connections to enable appropriate communications among the aforementioned components.

In the embodiment of FIG. 2, the processor 210 is a hardware device for executing software that can be stored in memory 220. The processor 210 can be any custom-made or commercially available processor, a central processing unit (CPU) or an auxiliary processor among several processors associated with the computing device 200, a semiconductor-based microprocessor (in the form of a microchip) or a macroprocessor.

Memory 220 can include any one or combination of volatile memory elements (e.g., random access memory (RAM, such as dynamic RAM or DRAM, static RAM or SRAM, etc.)) and nonvolatile-memory elements (e.g., read-only memory (ROM), hard drives, tape drives, compact discs (CD-ROM.). Moreover, the memory 220 may incorporate electronic, magnetic, optical, and/or other types of storage media now known or later developed. Note that memory 220 can have a distributed architecture, where various components are situated remote from one another, but accessible by processor 210.

The software in memory 220 may include one or more separate programs, each of which comprises an ordered listing of executable instructions for implementing logical functions. In the example of FIG. 2, the software in the memory 220 includes operating system 222, one or more application(s) 224, and a software monitor 300. Application(s) 224 and software monitor 300 function as a result of and in accordance with operating system 222. Operating system 222 controls the execution of the other application(s) 224 and computer programs, such as software monitor 300, and provides scheduling, input-output control, file and data management, memory management, and communication control and related services.

Software monitor 300 and application(s) 224 include one or more source programs, executable programs (object code), scripts, or other collections each comprising a set of instructions to be performed. As will be explained in detail below, software monitor 300 includes logic that controls the execution of application(s) 224. More specifically, software monitor 300 includes logic that controls the execution of a child process or thread generated by a modified parent process found within application(s) 224 where the parent process or thread includes a vfork system call. As illustrated in FIG. 2, software monitor 300 includes an instrumentation engine 310, a process monitor 320, and a monitoring interface 330. It should be well-understood by one skilled in the art, after having become familiar with the teachings of the improved interface, that software monitor 300 and application(s) 224 may be written in a number of programming languages now known or later developed. Moreover, software monitor 300 and application(s) 224 may be stored across distributed memory elements in contrast with the memory 220 shown in FIG. 2.

The input/output device(s) 230 may take the form of human/machine devices, such as but not limited to, a keyboard, a mouse or other suitable pointing device, a microphone, etc. Furthermore, the input/output device(s) 230 may also include known or later developed input/output devices, for example but not limited to, a printer, a display device, an external speaker, etc.

Network-interface device(s) 240 may include a host of devices that may establish one or more communication sessions between computing device 200 and one or more local and/or wide area networks. Network-interface device(s) 240 may include but are not limited to, a modulator/demodulator or modem (for accessing another device, system, or network); a radio frequency (RF) or other transceiver; a telephonic interface; a bridge; an optical interface; a router; etc. For simplicity of illustration and explanation, these aforementioned two-way communication devices are not shown.

When the computing device 200 is in operation, the processor 210 is configured to execute software stored within the memory 220, to communicate data to and from the memory 220, and to generally control operations of the computing device 200 pursuant to the software. Operating system 222, one or more application(s) 224, and the software monitor 300, in whole or in part, but typically the latter, are read by the processor 210, perhaps buffered within the processor 210, and then executed in accordance with the respective instructions.

It should be understood that software monitor 300 can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. A "computer-readable medium" can be any methods and resources for storing, communicating, propagating, or transporting a program for use by or in connection with the instruction execution system, apparatus, or device. The computer-readable medium can be, for example but not limited to, an electronic, magnetic, optical, electromagnetic, infrared, or semiconductor system, apparatus, device, or propagation medium now known or later developed. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Those skilled in the art will understand that various portions of software monitor 300 can be implemented in hardware, software, firmware, or combinations thereof. In a preferred embodiment, software monitor 300 is implemented using software that is stored in memory 220 and executed by a suitable instruction execution system. If implemented solely in hardware, as in an alternative embodiment, software monitor 300 can be implemented with any or a combination of technologies well-known in the art (e.g., discrete logic circuits, application-specific integrated circuits (ASICs), programmable-gate arrays (PGAs), field-programmable gate arrays (FPGAs), etc.), or technologies later developed.

In one embodiment, the software monitor 300 is implemented via a combination of software and data stored in memory 220 and executed and stored or otherwise processed under the control of processor 210. It should be noted, however, that software monitor 300 is not dependent upon the nature of the underlying processor 210 or memory 220 in order to accomplish designated functions.

Figure 3:
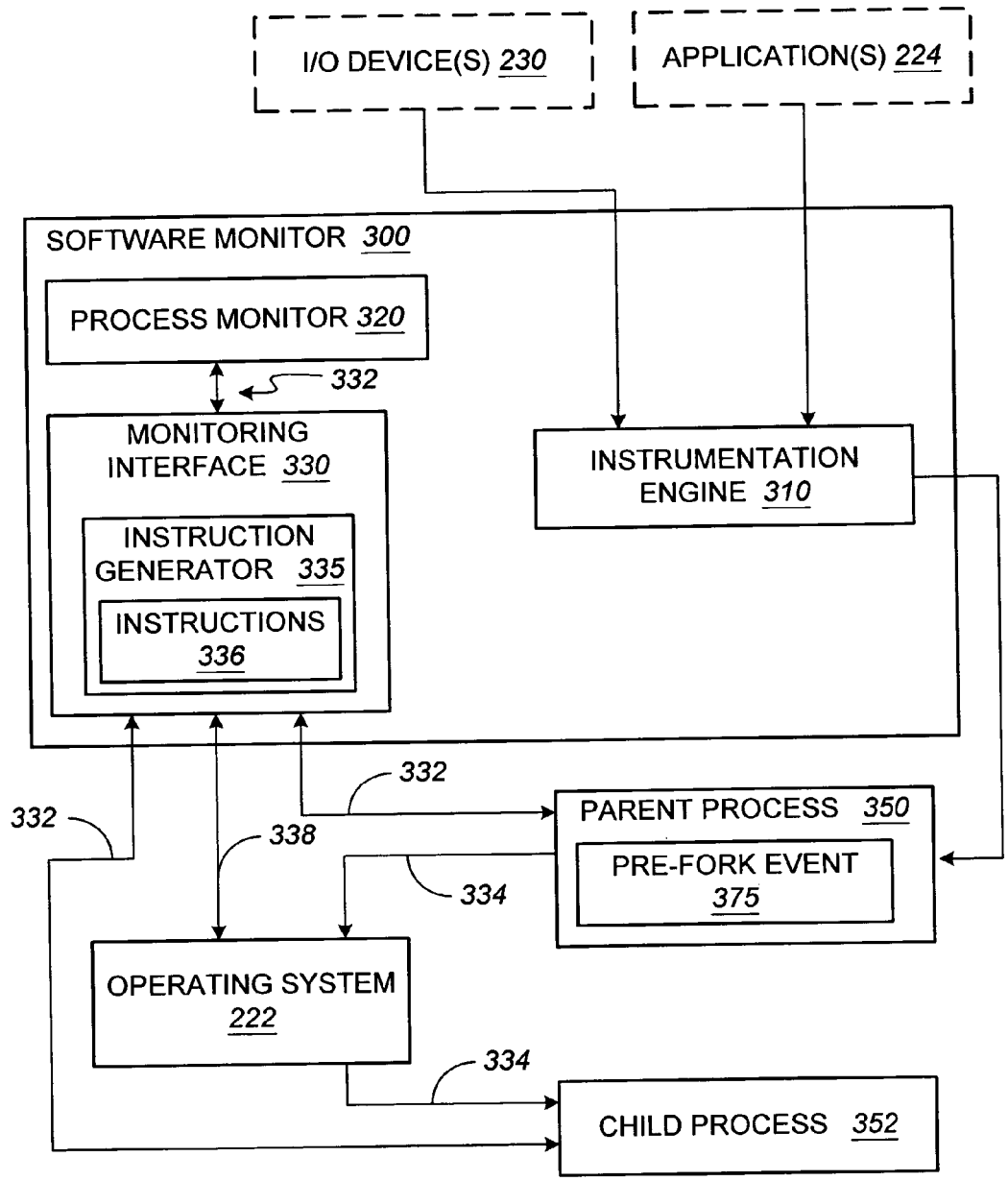
FIG. 3 is a functional block diagram of an embodiment of a software monitor.

Reference is now directed to FIG. 3, which presents a functional block diagram of an embodiment of software monitor 300. In the present embodiment, software monitor 300 instruments or otherwise modifies code. In other embodiments, software monitor 300 may employ sampling techniques that do not necessitate modification of a parent process. As illustrated in FIG. 3, software monitor 300 comprises the instrumentation engine 310, process monitor 320, and a monitoring interface 330. Before software monitor 300 can collect and analyze performance information regarding a specific thread or process, instrumentation engine 310 inserts or otherwise modifies code in the target process or thread. Preferably, software monitor 300 contains logic that in accordance with dynamic binary-instrumentation techniques, instruments or modifies only those portions of parent process 350 that will be executed by processor 210.

Instrumentation engine 310 may receive data via various input/output devices 230, data stored in memory 220 (FIG. 2), as well as various application(s)224. The data will identify one or more target processes or threads to instrument. In addition, the data may include various parameters and flags that instrumentation engine 310 uses in generating parent process 350. Alternatively,instrumentation engine 310 can be programmed with one or more default parameters to apply when modifying the target process. Instrumentation engine 310, having received data identifying the target process or thread applies the various parameters and flags and generates parent process 350. Parent process 350 is an instrumented or modified version of the identified target process or thread.

As further illustrated in the functional block diagram of FIG. 3, software monitor 300 includes process monitor 320. Process monitor 320 includes logic for coordinating the collection of data during execution of parent process 350. When parent process 350 includes one or more vfork system calls, process monitor 320 ensures that data collected during execution of both the parent process 350 and its child process 352 are associated with the process responsible for generating the data. As shown in FIG. 3, process monitor 320 functions through monitoring interface 330 and the underlying operating system 222. Information flows between process monitor 320 and monitoring interface 330 can include monitored system calls, events, and signals 332.

Monitoring interface 330 includes logic for receiving and responding to the various trace system calls, events, and signals 332. In addition, monitoring interface 330 includes instruction generator 335. Instructions 336 are in accordance with the underlying operating system 222. As illustrated in FIG. 3, monitoring interface 330 receives and responds to trace system calls, events, and signals 332 generated and sent by parent process 350, child process 352, and process monitor 320.

Operating system 222 as illustrated in FIG. 3, sends and receives instructions 336 both to and from monitoring interface 330 via instruction interface 338. In addition, operating system 222 receives a vfork system call via connection 334 from parent process 350. As provided in the UNIX® operating system and many of its proprietary and open source derivatives, a vfork system call suspends execution of parent process 350 and generates child process 352 which contains a copy of the instrumented code and trace calls, events, and signals contained within parent process 350.

However, in addition to the other trace system calls, events, and signals 332, parent process 350 communicates a pre-fork event 375 to monitoring interface 330. Pre-fork event 375 includes indicia identifying child process 352 before it is created by a subsequently executed vfork system call within parent process 350. The indicia includes at least a process identifier of the child process 352. Monitoring interface 330 further includes logic configured to recognize and respond to the pre-fork event 375.

While the functional block diagram presented in FIG. 3 illustrates software monitor 300 as having a single centrally-located instrumentation engine 310 with co-located process monitor 320 and monitoring interface 330, it should be understood that the various functional elements of software monitor 300 may be distributed across multiple locations in memory 220 and/or across multiple memory devices (not shown). It should be further understood that instrumentation engine 310 is not limited to dynamic binary instrumentation techniques and may include logic in accordance with binary instrumentation techniques (i.e., logic that instruments all portions of the identified parent process 350) and statistical sampling and other applications that can exploit the pre-fork event 375.

Figure 4:
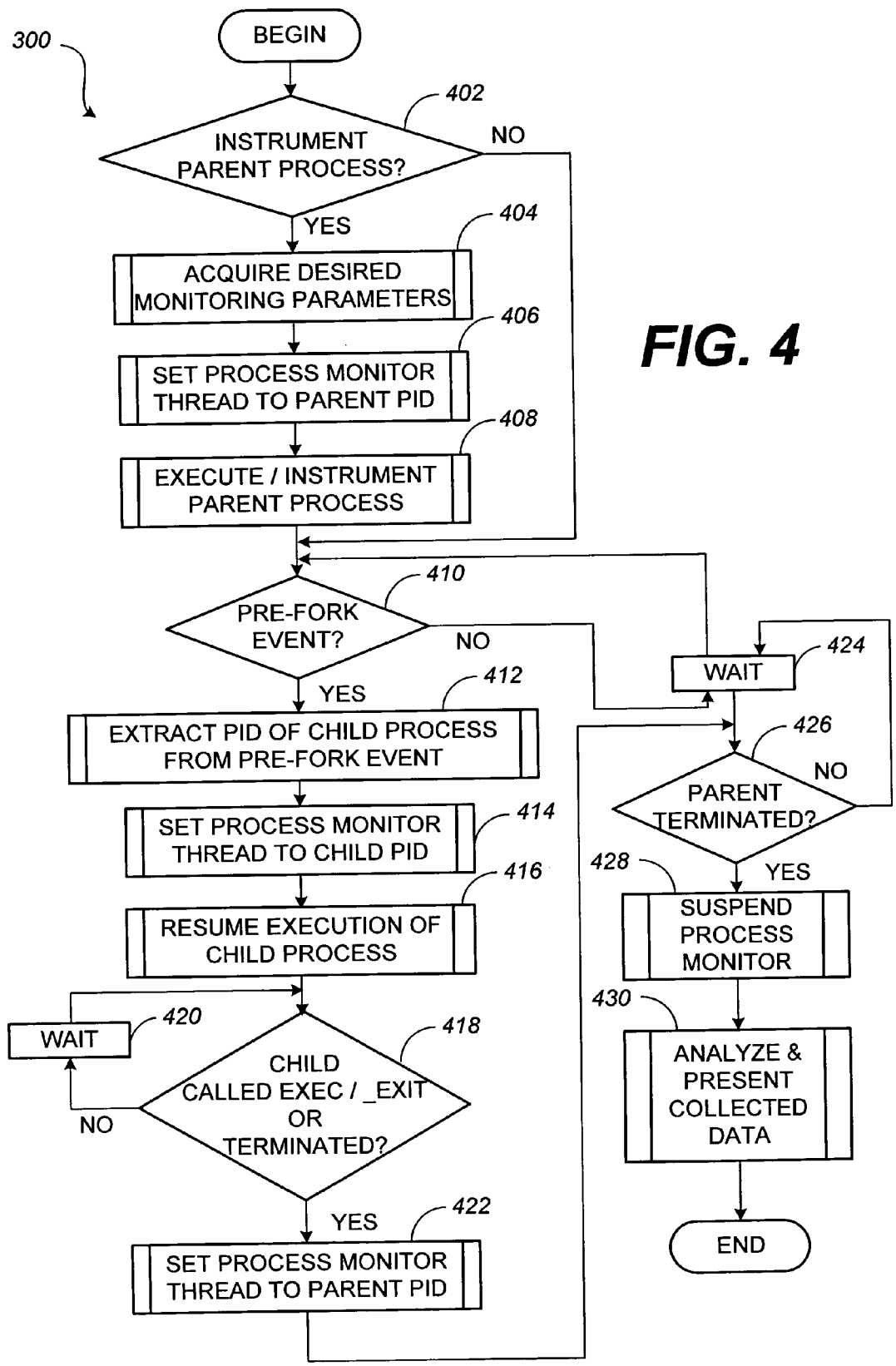
FIG. 4 is a flow chart illustrating an embodiment of a method for controlling execution of a child process that can be implemented by the software monitor of FIG. 3.

Reference is now directed to the flow chart illustrated in FIG. 4. In this regard, the various functions shown in the flow chart present a method for controlling the execution of a child process created from a parent process, where the parent process is instrumented by a software toot that may be realized by software monitor 300. As illustrated in FIG. 4, the method may begin by determining whether it is desired to instrument a parent process as shown in query 402. When it is determined that it is desirable to instrument the parent process as indicated by the flow control arrow labeled "YES" that exits query 402, the method responds by acquiring desired monitoring parameters, as indicated in block 404. Otherwise, as indicated by the flow control arrow labeled "NO," the method bypasses blocks 404 through 408 and waits for an indication of a pre-fork event.

Returning to the condition where it is desired to instrument the parent process, as illustrated in block 406, a process monitor thread is set to communicate with the parent process. As shown in block 408, the parent process is executed and instrumented to extract or otherwise record desired parameters.

Thereafter, as indicated in the wait loop formed by query 410 and wait block 424, execution of the parent process continues until a pre-fork event is detected. When a pre-fork event is detected, as indicated by the flow control arrow labeled "YES" exiting query 410, the function indicated in block 412 is performed. More specifically, the process identifier of the child process that will be created by the subsequent vfork system call is extracted from the pre-fork event.

Thereafter, as indicated in block 414, a process monitor thread is configured to respond to trace events generated by the future child process. Next, as shown in block 416, execution of the child process resumes.

As described above, a child process that contains a copy of the parent process (including code inserted by an instrumentation process) is generated and executed in accordance with the vfork system call. In addition, the parent process is suspended until the child process calls an exec or an _exit system call. When it is determined that the child process has invoked one of those calls or has been terminated by the operating system, as indicated by the flow control arrow labeled "YES" exiting query 418, the process monitor is configured to monitor trace events generated by the parent process, as indicated in block 422, before resuming execution of the parent process.

Execution of the parent process continues, as indicated in the wait loop formed by query 426 and wait block 424, until the parent process generates an exec or _exit call or is terminated by the operating system. When it is determined that the parent process has generated one of the exec or _exit calls or has been terminated, as indicated by the flow control arrow labeled "YES" exiting query 426, the process monitor is suspended as indicated in block 428 and run-time data observed during execution of the parent process is collected, analyzed, and presented as shown in block 430.

Those skilled in the art will understand that the method for controlling the execution of a child process created from a parent process illustrated in FIG. 4 can be extended to control any number of processes, for example by using separate threads to monitor each process of interest. Since a given process can only execute a single vfork system call at a time (since it becomes blocked while executing the system call), the design therefore addresses the general case of multiple monitored processes that may call vfork.

Figure 5:
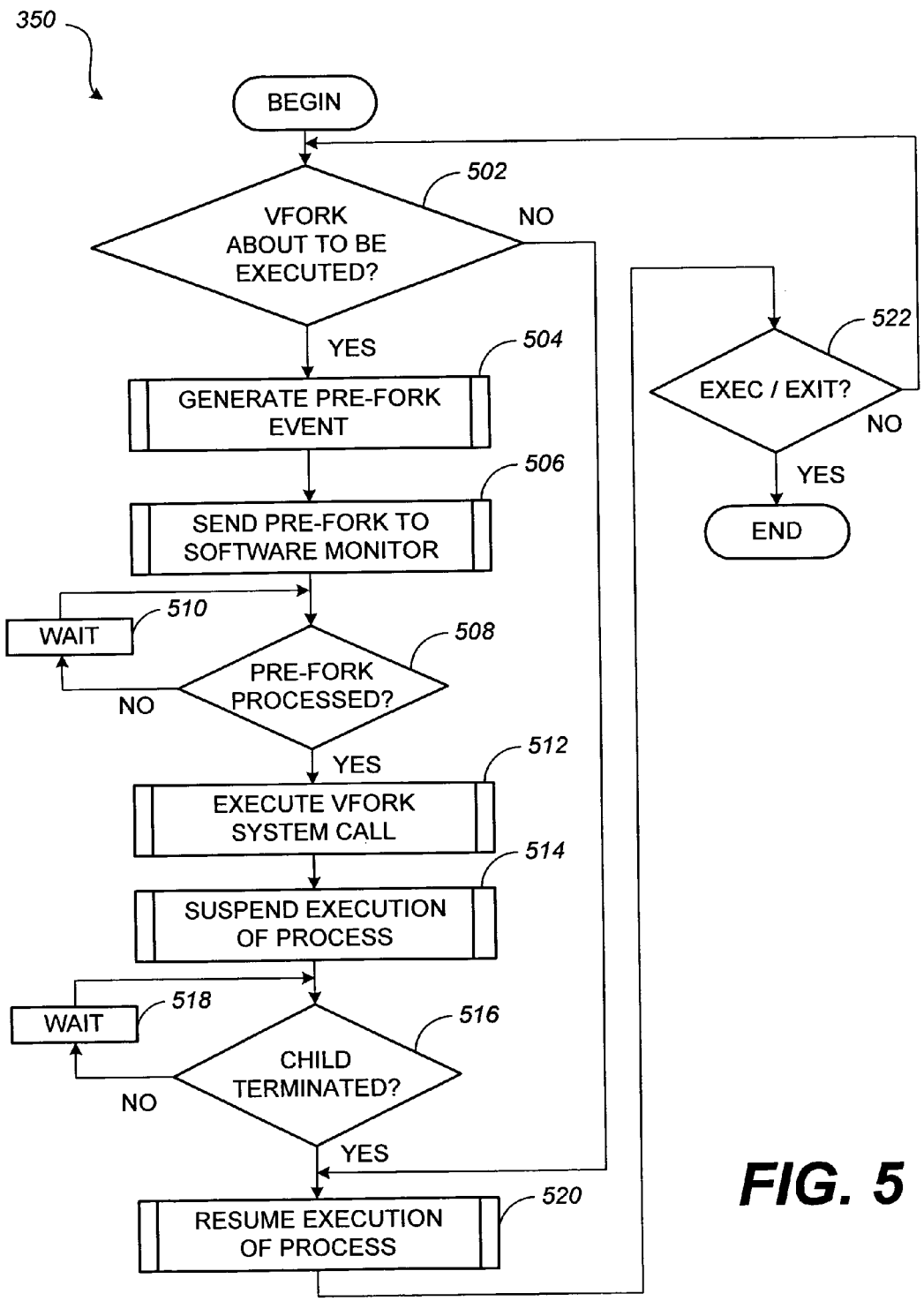
FIG. 5 is a flow chart illustrating an embodiment of a method for executing a parent process that can be implemented by the software monitor of FIG. 3.

FIG. 5 is a flow chart illustrating an embodiment of a method for executing a parent process instrumented by a software tool to ensure execution of a child process when the parent process contains a vfork system call. As illustrated in query 502, the parent process 350 begins by determining if a vfork system call is about to be executed by the parent process or thread. When it is determined that a vfork system call is about to be executed by the parent process or thread as indicated by the flow control arrow labeled "YES" that exits query 502, the parent process generates a pre-fork event as indicated in block 504. Next, as shown in block 506, the parent process sends the pre-fork event to the software tool responsible for monitoring the parent process.

Thereafter, as indicated in the wait loop formed by query 508 and wait block 510, execution of the parent process is suspended until after the parent receives an indication from the software tool that the pre-fork event has been successfully processed. When the pre-fork event has been processed, as indicated by the flow control arrow labeled "YES" exiting query 508, the parent is activated and executes the vfork system call as shown in block 512. Once the vfork system call has been executed, the parent is suspended as indicated in block 514.

As indicated in the wait loop formed by query 516 and wait block 518, the parent process remains suspended until the parent receives an indication that the child process has invoked an exec or an _exit system call, thus generating corresponding events. When the child process has invoked the exec or _exit system call, as indicated by the flow control arrow labeled "YES" exiting query 516, the parent process resumes as shown in block 520. As indicated in query 522, the parent process continues until the process generates an exit event. As shown by the flow control arrow labeled "NO" exiting query 522, the parent is configured to report any future vfork system call by repeating the functions and queries described above.

Those skilled in the art will understand that the method for executing a parent process monitored by a software tool to ensure execution of a child process when the parent process contains a vfork system call illustrated in FIG. 5 is configured to generate and send a pre-fork event before executing a vfork system call. The parent process or thread may be implemented via multiple threads for controlling the performance of the desired functions. A given thread may be responsible for handling monitoring events generated by a single process or from multiple processes. Multiple such threads may be executed as may be desired by a parent process or thread to implement the various functions illustrated in FIG. 5.

Figure 6:
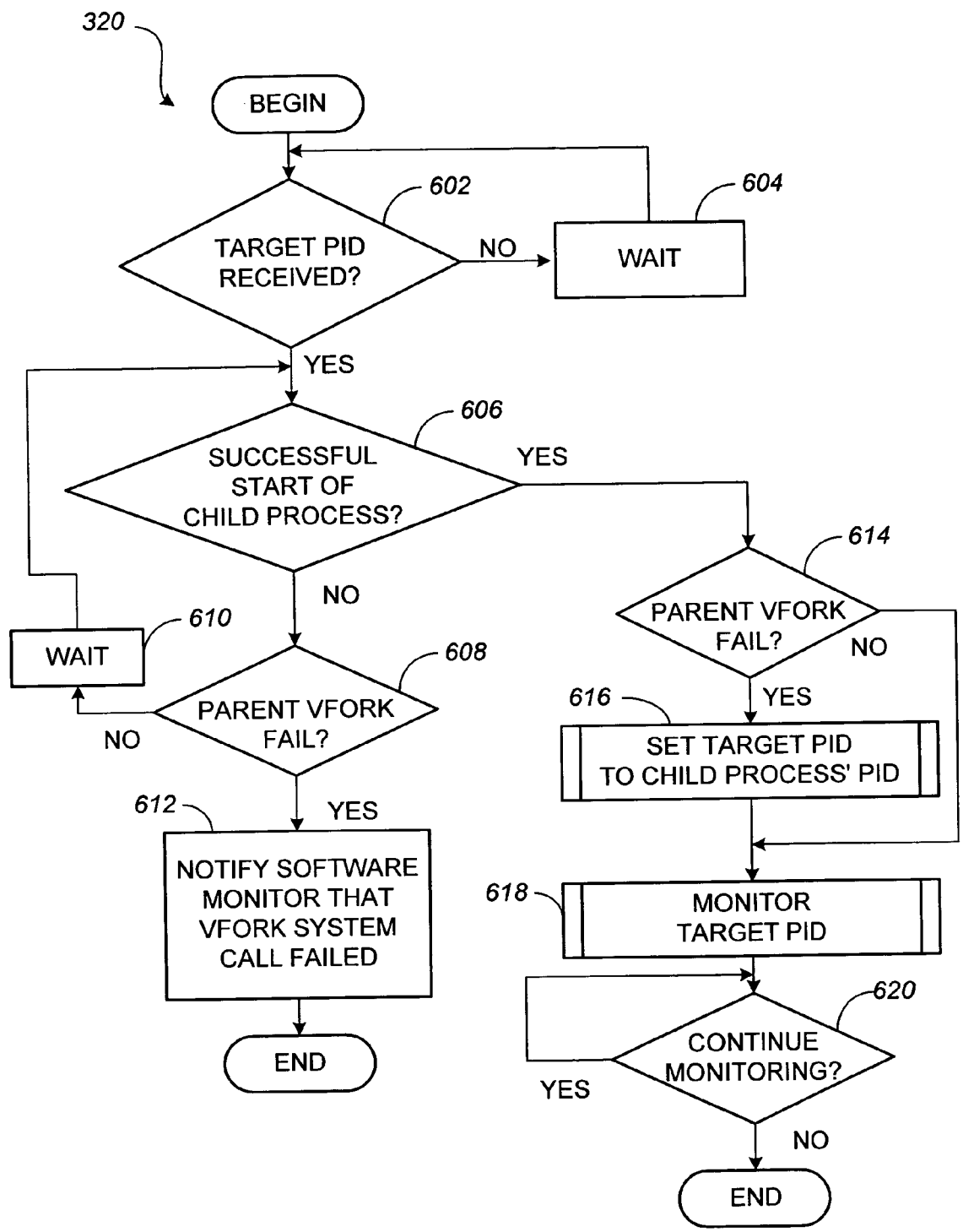
FIG. 6 is a flow chart illustrating an embodiment of a method for executing a process monitor that can be implemented by the software monitor of FIG. 3.

Reference is now directed to the flow chart illustrated in FIG. 6, which illustrates an embodiment of a method for controllably switching a target process of a process monitor thread between an instrumented parent process and a child process generated by the parent process. In this regard, process monitor 320 begins with query 602 where it is determined if a target PID has been received. If the result of query 602 indicates that the PID has not been received, as indicated by the flow control arrow labeled "NO" exiting query 602, processing continues after wait block 604. Once query 602 indicated that a target PID has been received, query 606 is performed to determine if the child process has started. If the result of query 606 indicates that the child process has not started successfully, process monitor 320 is configured to determine if the vfork system call issued by the parent process has failed as indicated in query 608. When the parent process vfork system call has not failed, query 606 is repeated after wait block 610. When the result of query 608 indicates that the parent vfork system call has failed, as indicated by the flow control arrow labeled "YES" exiting query 608, the process monitor 320 is configured to notify the software monitor that the vfork system call failed as indicated in block 612.

Otherwise, when query 606 indicates that the child process has successfully started as indicated by the flow control arrow labeled "YES" exiting query 606, query 614 is performed to determine if the parent vfork system call failed. When query 614 indicates that the parent vfork system call has not failed, block 616 is bypassed. Otherwise, when query 614 indicates that the parent vfork system call has failed, process monitor 320 sets a target PID to the child process PID as indicated in block 616. Thereafter, process monitor 320 monitors trace events from the target PID as indicated in block 618. Process monitor 320 continues to monitor trace events from the child process associated with target PID until the process executes an exec or _exit system call or is otherwise terminated by the operating system.

Figure 7:
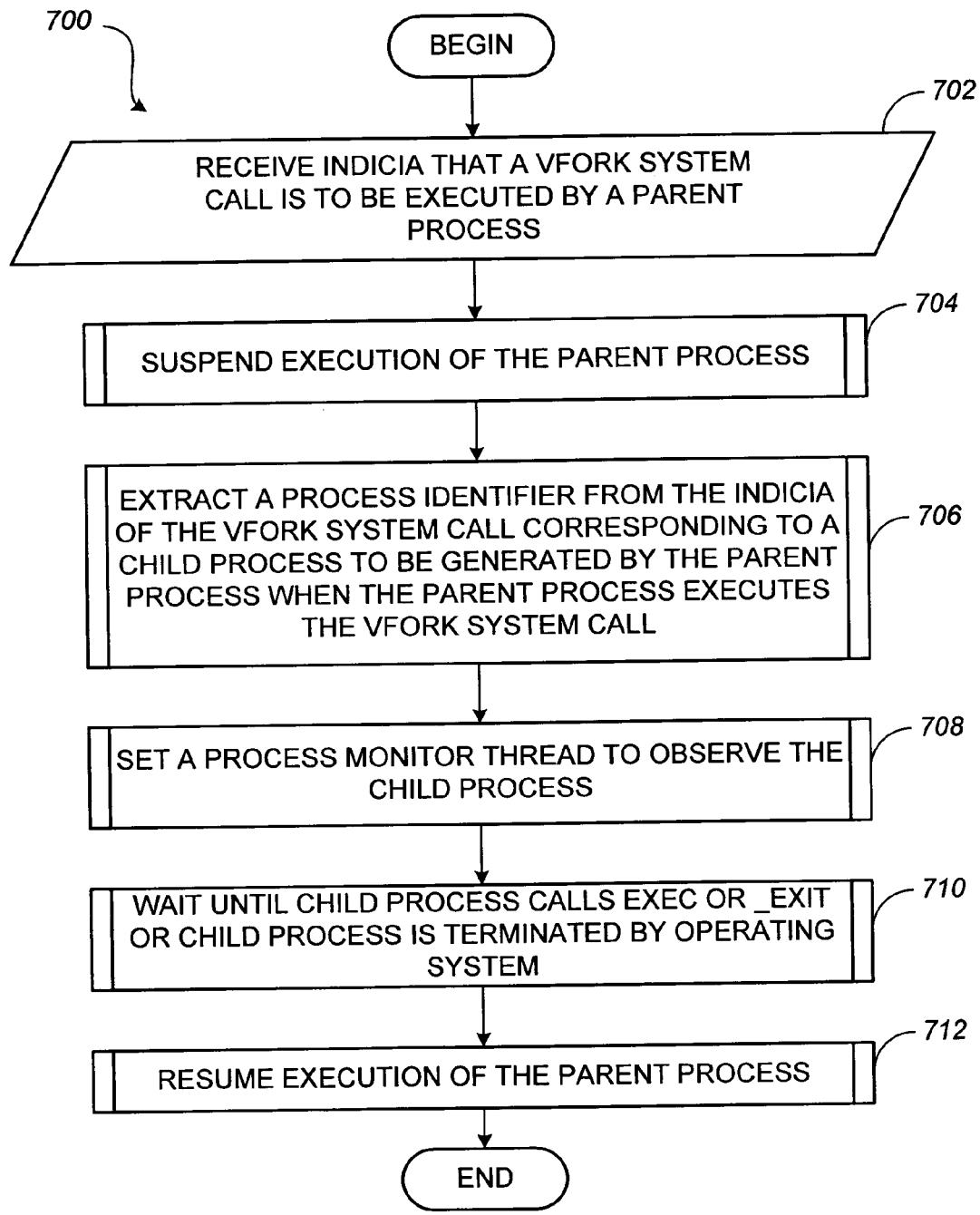
FIG. 7 is a flow chart of an embodiment of a method for controlling the execution of a child process.

FIG. 7 is a flow chart of an embodiment of a method 700 for controlling the execution of a child process. When an appropriately configured software tool receives indicia that a vfork system call is about to be executed by a parent process, as indicated in block 702, the software tool suspends execution of the parent process as illustrated in block 704. While the parent process is suspended, as indicated in block 706, the software tool extracts a process identifier from the indicia of the vfork system call corresponding to a child process to be generated by the process when the parent executes the pending vfork system call. In block 708, the software tool sets a process monitor thread to observe the execution of the child process. The software tool waits until the child process calls exec or _exit or the child process is terminated by the operating system as shown in block 710. Once, the software tool receives an indication that the child process has ended, the tool resumes execution of the parent process as indicated in block 712.

Figure 8:
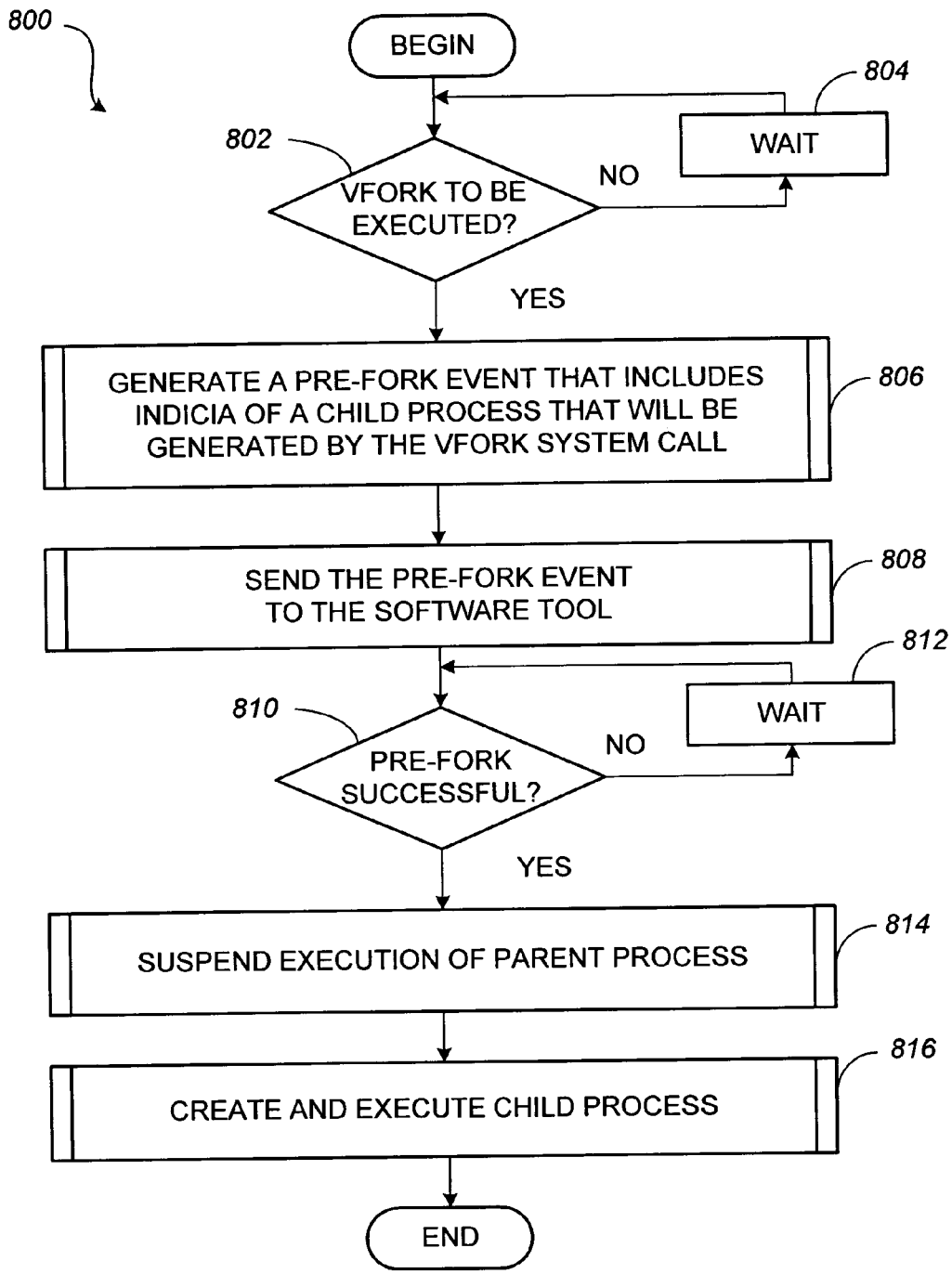
FIG. 8 is a flow chart of an embodiment of a method for executing an instrumented parent process to ensure execution of a child process.

FIG. 8 is a flow chart of an embodiment of a method for executing an instrumented parent process to ensure execution of a child process. When an appropriately configured software tool receives indicia that a vfork system call is about to be executed by a parent process, as indicated in block 802, the software tool generates a pre-fork event that includes indicia of a child process that will be generated by the vfork system call, as shown in block 806. Otherwise, the software tool waits for an amount of time to pass, as illustrated by the flow control arrow labeled "NO" exiting block 802 and wait block 804 before repeating the query of decision block 802.

Once the pre-fork event has been generated, the software tool receives the pre-fork event as shown in block 808. Thereafter, as indicated in decision block 810, the software tool determines if the pre-fork event has processed successfully. When it is determined that the pre-fork event has not completed successfully, as indicated by the flow control arrow labeled "NO" exiting block 810 and wait block 812, the software tool repeats the query of decision block 810. It should be understood that this portion of the flow chart assumes that the pre-fork event will eventually terminate successfully. Those skilled in the art may insert additional failure handling mechanisms to recover from a pre-fork instruction execution failure.

Otherwise, when it is determined that the pre-fork event has successfully terminated, as indicated by the flow control arrow labeled "YES" exiting decision block 810, the software tool suspends execution of the parent process as shown in block 814. Thereafter, the software tool directs the creation of execution of the child process as shown in block 816 to enable the software tool to monitor execution of the child process.

Any process descriptions or blocks in the flow charts presented in FIGS. 4-8 should be understood to represent modules, segments, or portions of code or logic, which include one or more executable instructions for implementing specific logical functions in the associated process. Alternate implementations are included within the scope of the disclosed methods in which functions may be executed out-of-order from that shown or discussed, including substantially concurrently or in reverse order, depending on the functionality involved, as would be understood by those reasonably skilled in the art after having become familiar with the improved monitoring interface and the associated methods for controlling the execution of a child process generated by an instrumented parent process.

We claim:

1. A method for controlling the execution of a child process created from a parent process, the method comprising:

instrumenting a parent process;

monitoring execution of the parent process with a process monitor to collect information as to the run-time behavior of the parent process;

before a vfork system call is executed, receiving with the process monitor indicia from the parent process that a vfork system call will be executed by the parent process;

suspending execution of the parent process;

extracting with the process monitor a process identifier from the indicia, the process identifier identifying a child process to be generated by the parent process when the parent process executes the vfork system call;

setting with the process monitor a process monitor thread to observe trace events generated by the child process;

resuming execution of the parent process to enable the parent process to execute the vfork system call; and again suspending execution of the parent process.

2. The method of claim 1, further comprising:

waiting for indicia that the child process has invoked at least one of an exec system call and an _exit system call or has been terminated by an operating system;

setting a process monitor thread to observe trace events generated by the parent process; and resuming execution of the parent process.

3. The method of claim 1, wherein receiving indicia comprises receiving a pre-fork event that includes a process identifier that identifies the child process.

4. The method of claim 1, further comprising analyzing run-time data observed during execution of the parent process once it is determined that the parent process has generated at least one of an exec system call and an _exit system call or has been terminated by an operating system.

5. A method for controllably switching a target process of a process monitor thread between an instrumented parent process and a child process generated by the parent process, the method comprising:

checking whether the successful initiation of the child process can be asserted;

when the successful initiation of the child process cannot be asserted checking if the parent process responsible for creating the child process received indicia of a failure of a vfork system call designated to create the child process by searching for a trace event while performing a non-blocking trace wait on the parent process;

when the indicia has not been received, waiting an amount of time before rechecking for the successful initiation of the child process; otherwise, notifying a software monitor of the unsuccessful initiation of the child process and resuming execution of the parent process; monitoring the parent process;

otherwise, when the successful initiation of the child process can be asserted, monitoring the successfully created child process.

6. The method of claim 5, wherein the step of checking whether the successful initiation of the child process can be asserted comprises verifying the success of a trace event by using the process identifier of the child process.

7. The method of claim 5, further comprising:

aborting child process monitoring when the initiation of the child process is unsuccessful.

8. A computer storage medium that stores a system, the system comprising:

a parent process configured to, before a vfork call is executed by the parent process, generate a pre-fork event that contains a process identifier of a child process that will be spawned from the parent process when the vfork system call is executed by the parent process; and a process monitor configured to receive the pre-fork event and process identifier before the vfork system call is executed by the parent process, to, responsive to receiving the pre-fork event and process identifier, suspend execution of the parent process, and to, also responsive to receiving the pre-fork event and process identifier, generate a process monitor thread that enables observation of trace events generated by the child process.

9. The computer storage medium of claim 8, wherein the process monitor is further configured to generate a process monitor that enables observation of the parent process upon resumption of execution of the parent process after receipt of indicia that the child process has invoked at least one of an exec system call and an _exit system call or has been terminated by an operating system.

10. The computer storage medium of claim 9, wherein the process monitor is further configured to resume execution of the parent process.

* * * * *

UNITED STATES PATENT AND TRADEMARK OFFICE
CERTIFICATE OF CORRECTION

| | | |
|---|---|---|
| PATENT NO. | : 7,415,699 B2 | Page 1 of 1 |
| APPLICATION NO. | : 10/608330 | |
| DATED | : August 19, 2008 | |
| INVENTOR(S) | : Eric Gouriou et al. | |

It is certified that error appears in the above-identified patent and that said Letters Patent is hereby corrected as shown below:

In column 9, line 43, delete "toot" and insert -- tool --, therefor.

In column 13, line 26, in Claim 5, after "asserted" insert -- , --.

Signed and Sealed this

Twenty-eighth Day of July, 2009

JOHN DOLL
*Acting Director of the United States Patent and Trademark Office*